May 7, 1935.  G. DI MAURO  2,000,067
COLLAPSIBLE CONTAINER
Filed Feb. 3, 1933  3 Sheets-Sheet 1
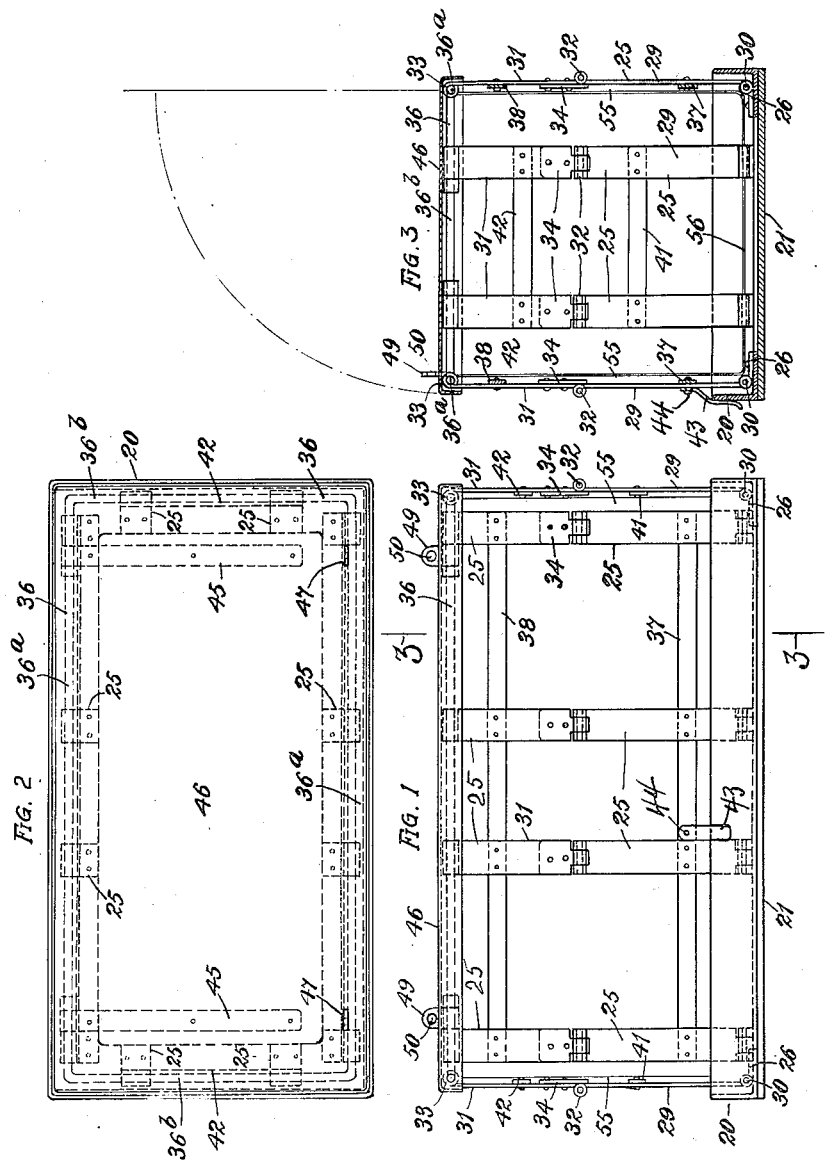
INVENTOR.
GIUSEPPE DI MAURO
BY A. A. de Bonneville
ATTORNEY.

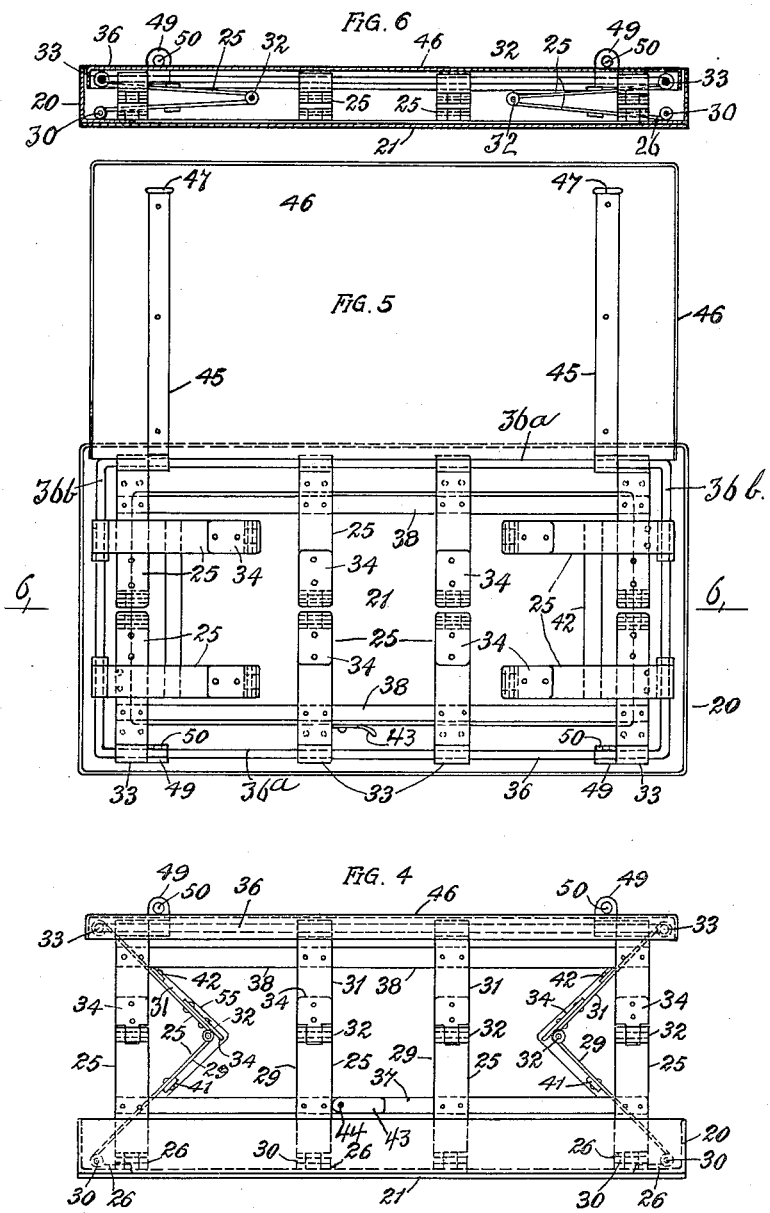

May 7, 1935.　　　G. DI MAURO　　　2,000,067
COLLAPSIBLE CONTAINER
Filed Feb. 3, 1933　　　3 Sheets-Sheet 3
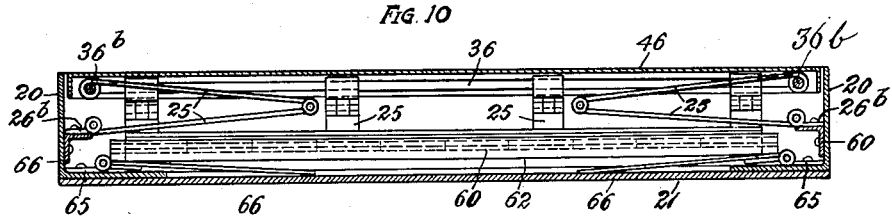
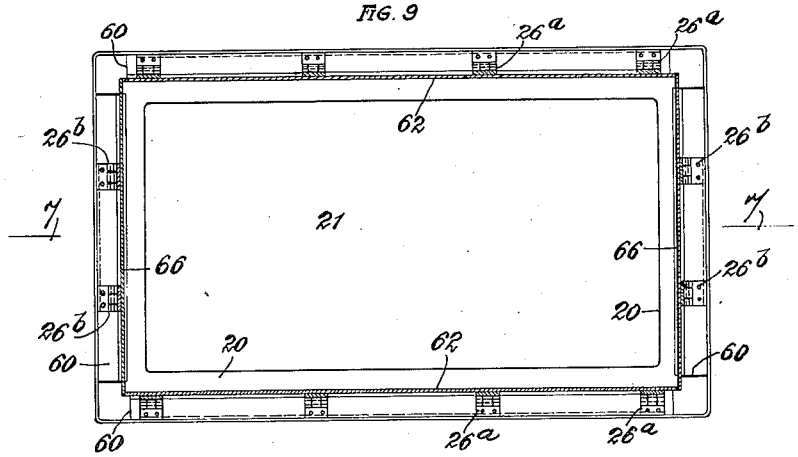
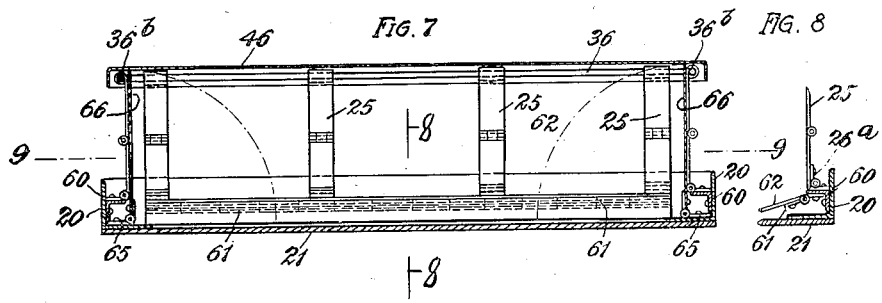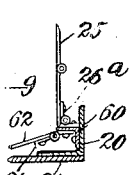
INVENTOR.
GIUSEPPE DI MAURO
BY A. A. de Bonneville
ATTORNEY

Patented May 7, 1935

2,000,067

UNITED STATES PATENT OFFICE

2,000,067

COLLAPSIBLE CONTAINER

Giuseppe Di Mauro, Brooklyn, N. Y., assignor, by direct and mesne assignments, of two-thirds to William M. Goldweber, Bayonne, N. J.

Application February 3, 1933, Serial No. 655,041

2 Claims. (Cl. 220—6)

This invention relates to a collapsible container.

The object of the invention, is the production of a collapsible container, which can be easily maintained in extended position.

The second object of the invention is the production of a container, which can be easily collapsed when empty without detaching any of the parts thereof.

The third object of the invention is the production of a collapsible container, which when collapsed is reduced in volume, to occupy small space when empty, to facilitate easy shipment.

The fourth object of the invention is the production of a collapsible container for easily shipping various articles safely in trucks and the like.

The fifth object of the invention is the production of a collapsible container, which can be easily attached to an automobile or other vehicle.

The sixth object of the invention is the production of a collapsible container which can function as an infant's play yard and also as a toy.

The seventh object of the invention is the production of a collapsible container, wherein all the collapsible parts thereof when collapsed are positioned within the bottom frame thereof and covered by the cover of the container, which latter is also positioned within said bottom frame.

In the accompanying drawings, Fig. 1 represents a front view of an exemplification of the improved collapsible container in extended position; Fig. 2 shows a top view of Fig. 1; Fig. 3 indicates a section of Fig. 1 on the line 3, 3; Fig. 4 shows a view similar to Fig. 1 with the container in partial collapsed position; Fig. 5 represents a top view of the container completely collapsed with its cover in its open position; Fig. 6 is a section of Fig. 5 on the line 6, 6 with the container completely collapsed and its cover in its closed position; Fig. 7 represents a section as on the line 7, 7 of Fig. 9 of a modification of the container in its extended position, and its cover in its closed position; Fig. 8 shows a section of Fig. 7 on the line 8, 8; Fig. 9 indicates a section of Fig. 7 on the line 9, 9 and Fig. 10 shows an enlarged section of Fig. 7 on the line 9, 9 with the container in its collapsed position.

Referring to Figs. 1 to 6, the collapsible container is indicated in this instance to comprise the rectangular angle shaped bottom frame 20, having longitudinal and side members, and to which is fastened the bottom plate 21. A plurality of stabilizers are each indicated in its entirety by the numeral 25. Each stabilizer comprises the hinge foot 26, which latter is fastened to the inner face of the lower leg of the member 20. To each hinge foot 26 is hinged the lower arm 29, by means of the hinge pin 30. To each arm 29 is hinged the upper arm 31, by means of the hinge pin 32, providing a pair of arms for each stabilizer. The upper end of each of the arms 31 has integral therewith the eye 33. A stop plate 34 is fastened to the lower end of each upper arm 31, and the lower end thereof extends beyond its accompanying hinge pin 32. An upper frame 36, preferably cylindrical in cross section is supported in the eyes 33. The said frame, comprises the longitudinal member 36a and the side members 36b. The arms 29 at the front and rear of the container are connected by the braces 37, and the arms 31 at the front and rear of the container are connected by the braces 38. At the sides of the container, the arms 29 are connected by the braces 41, and the arms 31 at the sides of the container are connected by the braces 42. It is to be noted that the stabilizers at the front and rear of the container are spaced to clear the stabilizers at the sides of the container in all positions thereof.

To the brace 37 at the front of the container is hinged the latch arm 43 on the pin 44 with which it is in tight frictional engagement. When the container is in extended position, the latch arm is positioned vertically to lock with the frame 20, as shown in Figs. 1 and 3. To collapse the container the latch arm 43 is positioned horizontally as shown in Figs. 4 and 5.

To one of the longitudinal members 36a of the upper frame 36 are hinged a pair of arms 45 to which is fastened the cover 46, having the locking openings 47. To the front longitudinal member 36a of the upper frame 36 are fastened the locking eyelets 49 each having an opening 50. When the cover 46 is in its closed position the eyelets 49 extend through the locking openings 47 of said cover. The hasp of a lock can be positioned through each of the openings 50 to lock the cover in place and thereby maintain the container in its extended position. The stop plates 34 prevent the arms 29 and 31 swinging outwardly and collapsing the container.

A bag having the vertical walls 55 and bottom wall 56 is positioned within the container and the upper ends of its walls 55 are fastened to the upper frame 36. When the container shown in Figs. 1 to 6 is collapsed, the bag having the walls 55 and 56 is folded with the stabilizers 25.

It will be noted, see Fig. 6 when the container is in its collapsed position the cover 46 is located within the angle shaped bottom frame 20, and that all the other parts of the container are positioned between said frame 20 and said cover 46, to protect them.

Referring to Figs. 7, 8, 9 and 10, the modified container is essentially of the same construction as already described for Figs. 1 to 6, and differs from the latter in the substitution of plates hinged to the member 20 of the bottom frame, in place of the bag having the walls 55 and 56. The description of the container in this modification will only include the essential elements. The angle shaped member of the bottom frame is again indicated at 20, with its bottom plate 21. To the vertical legs of the member 20 are fastened the angle irons 60, at the front, rear and sides of the container. To the lower face of the upper leg of each angle iron 60 at the front and rear of the container is fastened one member of the piano hinge 61, and to the other members of said piano hinges are fastened the front and rear plates or walls 62. Piano hinges 65 have each one of its members fastened to the horizontal leg of the angle shaped member 20 of the bottom frame at the sides of the container. To the other members of the piano hinges 65 are fastened the side plates or walls 66 of the container.

To the angle irons 60 at the front and rear of the container are fastened the hinge feet 26a, similar to 26, to which are hinged the stabilizers 25. To the angle irons 60 at the sides of the container are fastened the hinge feet 26b, similar to 26. To the hinge feet 26b are hinged the stabilizers 25 for the sides of the container. The upper frame 36 is again indicated with the longitudinal member as already described and the side members 36b.

When the container indicated in Figs. 7 to 10 is collapsed the plates 62 and 66 are swung down before the stabilizers 25 are collapsed.

It will be noted that to locate the container in its extended position the user raises the upper frame 36 and to collapse the container lowers said frame.

Various modifications may be made in the invention and the present exemplification is to be taken as illustrative and not limitative thereof.

Having described my invention I claim.

1. In a container the combination of a bottom frame, stabilizers each comprising an upper and lower arm hinged to each other, the lower end of each lower arm of each stabilizer hinged to said bottom frame, a brace connecting a plurality of the lower arms of said stabilizers and a latch arm hinged to said brace adapted to lock with said bottom frame, to maintain said stabilizers in operative position.

2. In a container the combination of an angle shaped bottom frame, stabilizers each comprising an upper and lower arm hinged to each other, the lower end of each lower arm of each stabilizer hinged to said bottom frame, an upper frame in hinged connection with the upper ends of the upper arms of said stabilizers, a cover hinged to said upper frame, said cover and said stabilizers when said container is collapsed, positioned within said angle shaped bottom frame, a brace connecting a plurality of the lower arms of said stabilizers and a latch hinged to said brace adapted to lock with said bottom frame to maintain said stabilizers in operative position.

GIUSEPPE DI MAURO.